(12) United States Patent
Ricci

(10) Patent No.: US 10,323,709 B2
(45) Date of Patent: Jun. 18, 2019

(54) SHOE FOR A DRUM BRAKE, AND ASSOCIATED DRUM BRAKE

(75) Inventor: Gérard Ricci, Saint Raphäel (FR)

(73) Assignee: GR INVESTISSEMENT (S.A.R.L.), Saint Raphael (FR)

( * ) Notice: Subject to any disclaimer, the term of this patent is extended or adjusted under 35 U.S.C. 154(b) by 738 days.

(21) Appl. No.: 13/378,898

(22) PCT Filed: Dec. 3, 2009

(86) PCT No.: PCT/FR2009/001372
§ 371 (c)(1),
(2), (4) Date: Feb. 7, 2012

(87) PCT Pub. No.: WO2010/146247
PCT Pub. Date: Dec. 23, 2010

(65) Prior Publication Data
US 2012/0137485 A1 Jun. 7, 2012

(30) Foreign Application Priority Data

Jun. 17, 2009 (FR) ...................................... 09 02944

(51) Int. Cl.
*F16D 65/08* (2006.01)
*F16D 69/04* (2006.01)
*B23P 6/00* (2006.01)

(52) U.S. Cl.
CPC .. *F16D 69/0416* (2013.01); *F16D 2069/0433* (2013.01); *Y10T 29/4973* (2015.01)

(58) Field of Classification Search
CPC .......... F16D 65/02; F16D 65/08; F16D 69/00; F16D 69/04; F16D 69/0416; F16D 69/0441; F16D 69/0425; F16D 2069/004; F16D 2069/0433; Y10T 29/4973

USPC ......... 188/250 B, 250 D, 250 E, 250 G, 234, 188/247
See application file for complete search history.

(56) References Cited

U.S. PATENT DOCUMENTS 2,542,377 A * 2/1951 Turkish ......................... 411/334
2,630,889 A    3/1953 Lewis
2,948,360 A * 8/1960 Lupton ......................... 188/234
(Continued)

FOREIGN PATENT DOCUMENTS

DE   2 111 529 A1      9/1971
EP     251545 A1 *     1/1988
(Continued)

OTHER PUBLICATIONS

International Search Report (PCT/ISA/210) dated Mar. 18, 2010, by French Patent Office as the International Searching Authority for International Application No. PCT/FR2009/001372.

*Primary Examiner* — Melody M Burch
(74) *Attorney, Agent, or Firm* — Buchanan Ingersoll & Rooney PC

(57) ABSTRACT

The invention concerns in particular a lining-holder cartridge for a drum brake equipped with shoes comprising a block provided with a rim for fixing a friction lining, the assembly forming a shoe for a drum brake, wherein it comprises a curved support in the form of a cylinder sector able to be fixed directly to the rim of said block, and it is provided with a friction lining with a shape adapted to that of said support. The invention greatly simplifies the replacement of drum brake linings, without removal of the brake blocks.

13 Claims, 6 Drawing Sheets

(56) References Cited

U.S. PATENT DOCUMENTS

| | | | | |
|---|---|---|---|---|
| 3,064,343 A | | 11/1962 | Baynes et al. | |
| 3,941,222 A | * | 3/1976 | Newstead | F16D 69/0416 |
| | | | | 188/250 G |
| 5,261,512 A | * | 11/1993 | Young | 188/250 B |
| 5,515,952 A | * | 5/1996 | Jackson | 188/250 E |
| 5,695,026 A | * | 12/1997 | Redgrave et al. | 188/250 D |
| 5,791,443 A | * | 8/1998 | Manz | 188/250 B |
| 8,261,890 B2 | * | 9/2012 | Paynter et al. | 188/250 B |
| 2005/0077127 A1 | | 4/2005 | Beri | |
| 2007/0056816 A1 | * | 3/2007 | Hayford et al. | 188/250 B |
| 2010/0025171 A1 | * | 2/2010 | Paynter | F16D 65/08 |
| | | | | 188/244 |

FOREIGN PATENT DOCUMENTS

| | | | |
|---|---|---|---|
| GB | 379618 | | 9/1932 |
| WO | WO-2008070997 A1 | * | 6/2008 |

\* cited by examiner

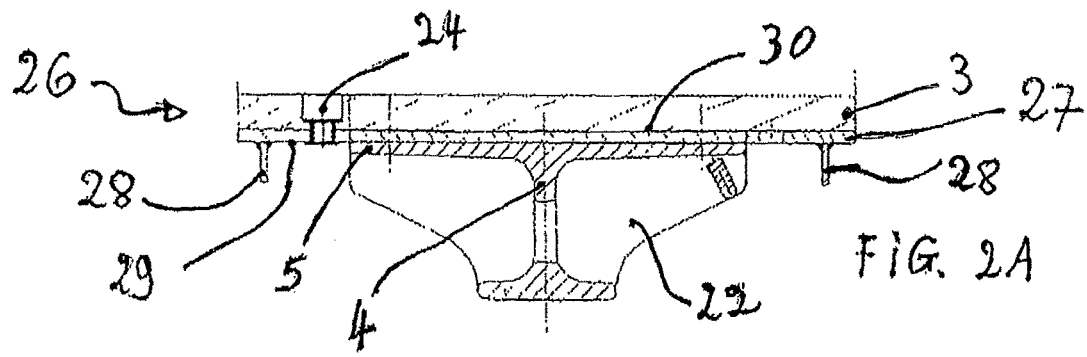
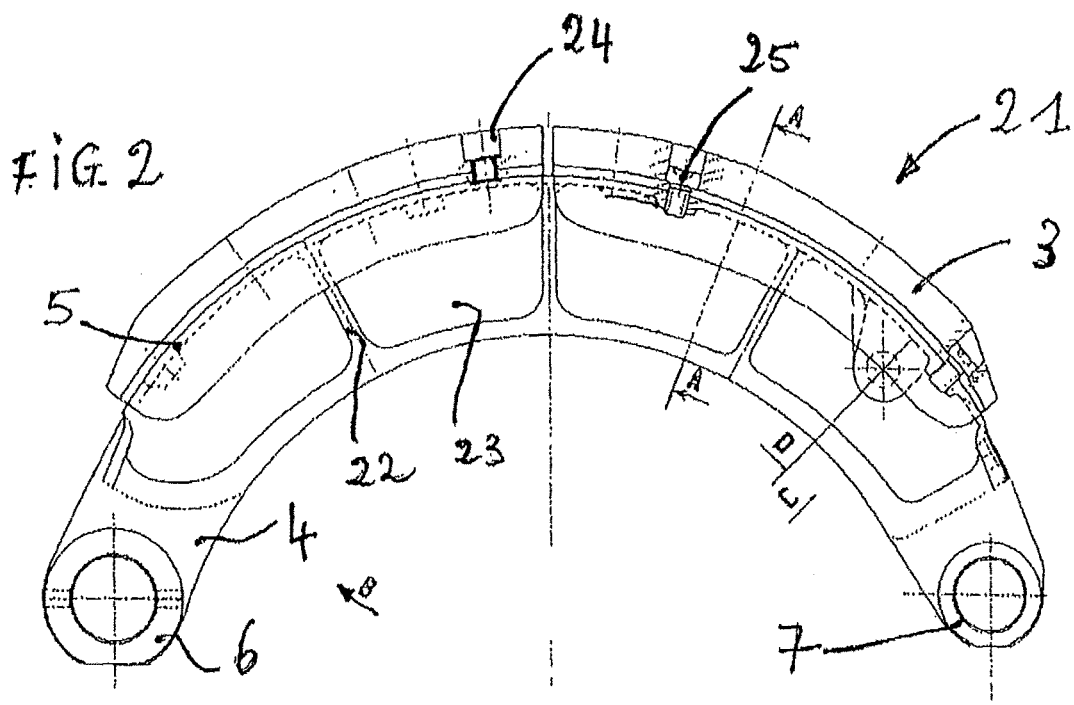

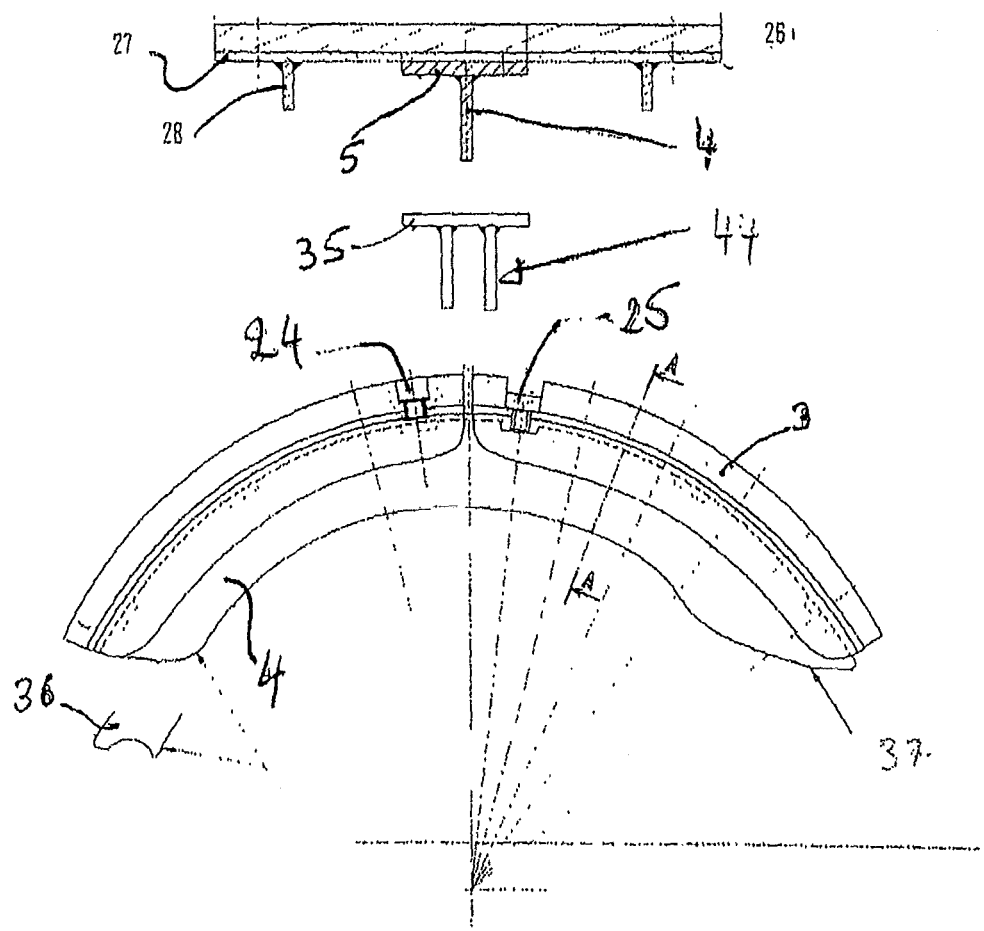

SHOE FOR A DRUM BRAKE, AND ASSOCIATED DRUM BRAKE

The present invention concerns a pneumatically or hydraulically controlled drum brake shoe for a vehicle, in particular for a heavy goods vehicle or for special machinery provided with drum brakes having a high braking capacity.

The aim of the invention is to facilitate the replacement of worn linings on drum brakes, by limiting the number of parts to be removed and refitted, and avoiding in particular the dismantling of brake shoes.

PRIOR ART

Drum brakes, which are a braking system consisting of a drum inside which there are situated at least two blocks provided with linings, have been known for a long time. The function thereof is to separate, by virtue of cams or pistons actuated during braking, thus causing a high degree of friction between the lining and the drum. This friction causes a braking effect in rotation of the drum with respect to the blocks and linings. Since the drum is secured to the wheel of the vehicle, the latter is braked.

The cams are typically actuated by a mechanical control (cable, tie rod), and the pistons are actuated by a hydraulic control.

Because of the competition from disc-brake technology and the specific advantages thereof (less risk of locking, better resistance to overheating), drum brakes have been largely replaced by disc brakes on an increasing number of powered vehicles, However, because of their superior braking torque and their better behaviour in muddy environments, drum brakes are keeping their advantage for braking heavy vehicles, such as heavy goods lorries, and for military equipment.

For this type of vehicle, the maintenance of existing drum brakes represents a significant expenditure, and a source of not insignificant operating costs.

This is because maintaining drum brakes requires immobilisation of the vehicle for several hours, all the more so since it is a case of heavy goods vehicles that have a large number of axles, and consequently a large number of wheels and brakes.

A typical maintenance operation then consists of removing the whole of the braking system and then fully dismantling the brake, that is to say: removing the screws, springs and fixed points, and disconnecting the drum and the block that carries the linings constituting the wearing parts. Next the new linings are fitted and the brake is reassembled, which is then remounted on the vehicle.

In addition, the lining is directly riveted to the block, which, in order to replace the lining, necessitates removing the brake, dismantling the block and then removing the fixing rivets in order to take off the worn lining. It is then necessary to rivet a new lining onto the block before entirely refitting the brake and replacing the brake on the vehicle.

It is therefore important to note that, in known drum brakes, it is not possible to replace the linings simply and quickly unlike disc-brake pads.

AIMS OF THE INVENTION

One aim of the invention is consequently the remedy the stated problem and the drawbacks of drum brakes according to the prior art.

Another aim of the invention is to propose a modified drum brake affording easy replacement of linings without requiring the brake blocks to be removed.

Another aim of the invention is to propose a drum brake capable of substantially reducing the cost of operating and maintaining the brake.

Another aim of the invention is to propose a modified drum brake that is easily adaptable to any type of drum brake.

SUBJECT MATTER OF THE INVENTION

The principle of the invention consists of proposing a modified shoe for a drum brake. This shoe consists of a block and a lining support. Whereas in the prior art the friction lining is directly riveted to the back of the block, the invention proposes to provide an intermediate support for the lining, a support that is then fixed directly to the block, instead of fixing the lining itself to the block. Fixing the lining to the block is therefore, according to the invention, indirect. The lining support, which will be referred hereinafter as the "lining-holder cartridge", or the "lining-holder pad", is a novel part in the field of drum brakes.

Moreover, the lining-holder cartridge is not riveted to the block, which would require removal thereof when the linings are replaced, but the whole of the lining-holder cartridge is screwed to the block, so that it suffices to unscrew it from the block without having to remove the latter when worn linings are replaced. According to an advantageous variant, instead of being screwed, the lining-holder cartridge is fixed to the block by means of pins.

The lining and its support thus form a cartridge that is much easier to replace, and in addition it becomes economical to manage a stock of lining-holder cartridges for a rapid standard exchange during drum brake maintenance operations.

More precisely, the subject matter of the invention is a lining-holder cartridge for a drum brake equipped with shoes comprising a block provided with a rim for fixing a friction lining, the assembly forming a shoe for a drum brake, characterised in that it comprises a curved support in the form of a cylinder sector able to be fixed directly to the rim of said block, and in that it is provided with a friction lining with a shape adapted to that of said support.

According to an advantageous embodiment, the lining comprises a plurality of through holes and is fixed to its support by a set of rivets positioned in said holes.

In addition, according to a first method of fixing the cartridge to the block, the support itself comprises a plurality of holes for fixing the lining-holder cartridge to the block of the shoe. The fixing of the lining-holder cartridge to the rim of the block is then obtained by means of self-locking screws that pass through the fixing holes in the cartridge and the ends of which are fixed in bores provided in the rim of the block.

According to another method of fixing the cartridge to the block, the lining-holder cartridge has a reinforcement gusset formed by a metal sector welded to the bottom face of the lining support of the lining-holder cartridge. This reinforcement gusset is provided with orifices, and the block has, for example at the rim, corresponding holes, so that pins engaged in said orifices and in said holes secure the lining-holder cartridge to the block.

In both embodiments, the linings are no longer directly riveted to the rim of the block, which would require removing the blocks for replacing the linings. On the contrary, the linings are fixed to an intermediate support, namely the cartridge support, which in its turn is fixed to the rim of the block, either by screwing or by pinning, so that the linings, which are the wearing parts, are no longer in direct connection with the rim of the block.

Advantageously, whatever the method of fixing the lining-holder cartridge to the block, relative positioning means can be provided, in the form of apertures provided in the cartridge support, and corresponding protrusions provided on the back of the rim of the block, which makes it possible to provide rapid and precise positioning of the cartridge with respect to the block, before they are secured together by screws or pins.

Another subject matter of the invention is a shoe for a drum brake, comprising a block composed of a radial web terminating in an axial rim in the form of a cylinder sector, characterised in that said rim is adapted to receive a lining-holder cartridge as previously defined.

In an economical embodiment of the shoe, the width of said rim is substantially less than the width of the support of the lining-holder cartridge.

In addition, yet another subject matter of the invention is a drum brake for a wheel on a vehicle comprising a plate, a drum and at least two brake shoes, each comprising a block actuated by a lever, and a friction lining acting on the drum during braking, characterised in that each shoe comprises a lining-holder cartridge according to the invention.

Yet another subject matter of the invention is a novel method of renovating a brake drum comprising at least one shoe as described previously, characterised in that it comprises the following steps:
removing the wheel provided with a drum brake;
removing the brake drum, keeping the block of the shoes of the brake in place;
removing the lining-holder cartridge that carries the worn linings, after having withdrawn the fixing pins;
replacing the worn lining-holder cartridge with a new lining-holder cartridge, and refixing the lining-holder cartridge either by screwing or by pinning;
replacing the drum;
replacing the wheel.

DETAILED DESCRIPTION OF THE INVENTION

Other features and advantages of the invention will emerge from a reading of the detailed description of the accompanying drawings, in which:

FIG. 2 shows an elevation partially in section, of a drum brake block provided with a lining-holder cartridge according to the invention;

FIG. 2A shows a view in transverse section A-A of the drum brake block according to FIG. 2;

FIG. 5 shows an elevation partially in section of a variant of a drum brake block provided with a lining-holder cartridge according to the invention;

FIG. 5A shows a view in transverse section A-A of a lining-holder cartridge of FIG. 5;

FIG. 1 shows a drum brake shoe according to the prior art. The structure of complete drum brakes being well known in the prior art, it is not necessary to describe an existing brake in its entirety.

Figure 1:
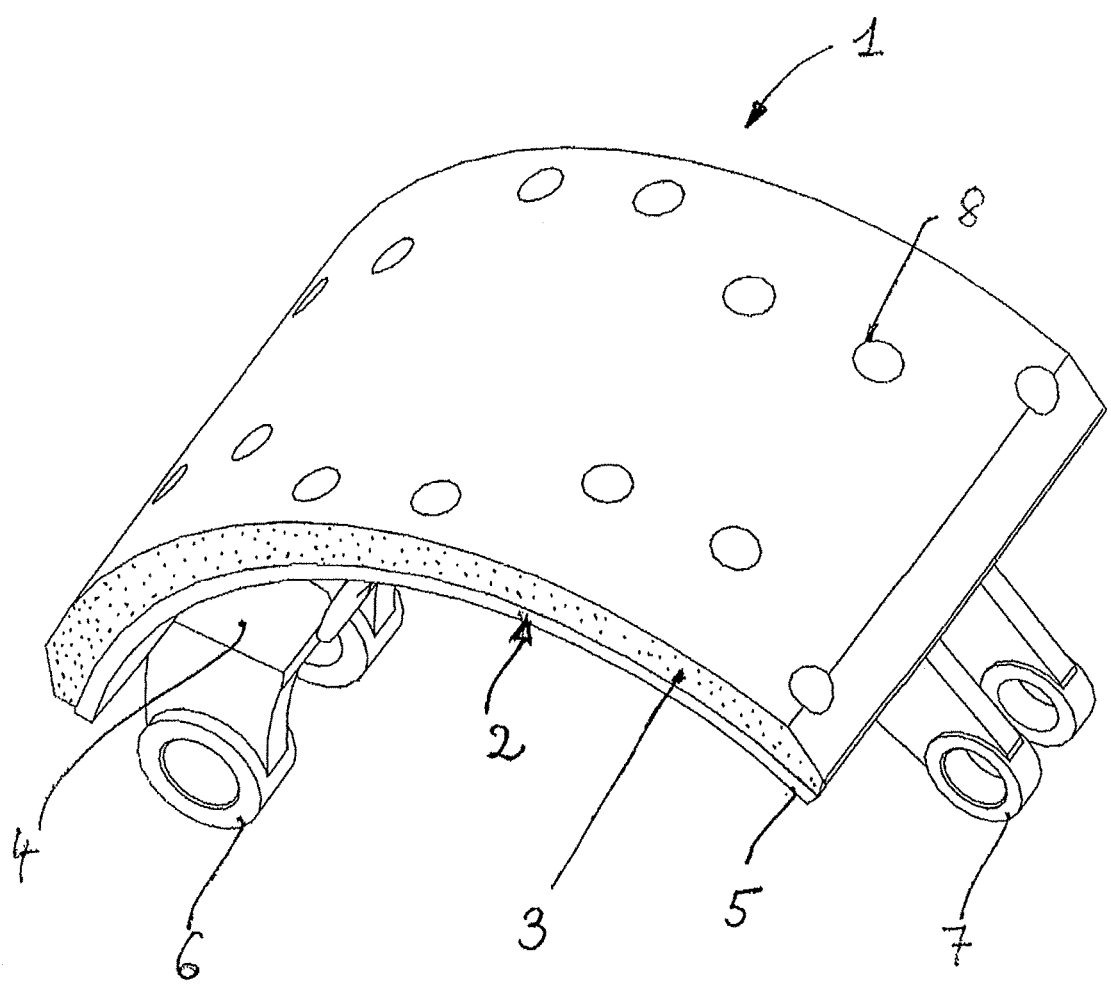
FIG. 1 shows a perspective view of a drum brake shoe according to the prior art.

As can be seen, the brake shoe 1 is composed of a block 2 that provides the rigidity of the shoe, and a friction lining 3 intended to come into contact with the inside of the drum, during braking.

The block 2 is provided with a radial web 4, arched in shape, surmounted by an axial rim 5 in the form of a cylinder sector, which is roughly perpendicular to the radial web 4.

The block 2 terminates at each end in a fork provided with bearings, namely a bearing 7 provided for a roller, and a bearing 6 provided for a fixed point.

The web 4 and the rim 5 of the block are typically made from cast iron or steel.

The width of the rim 5 is equal to the width of the lining 3, which increases the weight of the shoe, in particular when the rim is also made from cast iron.

FIG. 5 shows another variant of a block. However, it should be noted that the block 2 described with its ends 6, 7 and a web 4 and rim 2 can also adopt other design technology forms, not shown, without for all that limiting the scope of the present invention. These other methods of constructing the block are in general specific to different manufacturers.

In the prior art, the lining 3 is fixed directly to the rim 5 of the segment by a set of tubular rivets 8. Consequently, when the lining is worn, in order to be able to remove the lining 3 with respect to the rim 5, it is necessary to pierce the rivets 8, and consequently it is necessary to remove the whole of the shoe 1, which requires removing the whole of the drum brake, with the consequences already described in terms of labour time and the cost of immobilising the vehicle.

FIRST EMBODIMENT OF THE INVENTION

Reference is now made to FIG. 2. This figure shows in elevation a shoe 21 for a drum brake according to the invention. It comprises a block substantially in an arc of a circle, provided with a bearing 6 provided for a fixed point axis, and a bearing 7 provided for a roller. The block comprises a radial web 4, reinforced by transverse ribs 22.

The radial end of the web 4 comprises a rim 5 in the form a cylindrical sector, to which a lining-holder cartridge 26 (FIG. 2A) according to the invention is fixed. This lining-holder cartridge 26 comprises a metal support or plate 27, which serves as a rim with regard to the lining 3, and which is also cylindrical in shape, adapted to the cylindrical external shape of the rim 5 of the block 4.

The lining-holder cartridge 26 also comprises, over the whole of the width of the metal support 27, a friction lining 3, known per se, and intended to cooperate with the internal surface of the drum, not shown.

The friction lining 3 is preferably fixed to the metal support 27 by rivets 24.

Advantageously, the lining-holder cartridge 26 also comprises reinforcement gussets 28, in the form of plates in an arc of a circle welded perpendicularly to the internal face 29 (FIG. 2A) of the metal support 27, which is opposite to the external face 30 thereof, which carries the friction lining 3.

By means of these reinforcement gussets 28, it is possible to reduce the width of the rim 5 of the block 4, so that the rim 5 now has a width less than that of the lining-holder cartridge 26. This also lightens the lined shoe 21 and reduces the manufacturing cost thereof.

The lining-holding cartridge 26 is fixed to the rim 5 of the block 4 by a series of locked screws 25 (FIG. 2), passing through the metal support 27 of the cartridge 26 from the external face 30 thereof, and being inserted in screw threads provided in the rim 5 of the block 4.

The result of the structure according to the invention is that the lining-holder cartridge 26 represents an independent intermediate structure, easy to remove from the shoe 21. Without the lining-holder cartridge 26, the shoe 21 is bare and simply reduced to a block, resized with a rim less wide than in the prior art. With the lining-holder cartridge 26 in place, the shoe 21 is said to be "lined".

Figure 3A:
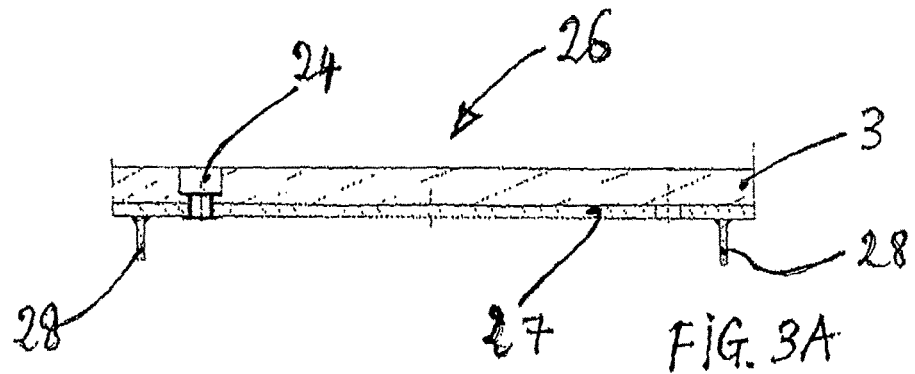
FIG. 3A shows a view in transverse section A-A of a lining-holder cartridge of FIG. 3.
Figure 3:
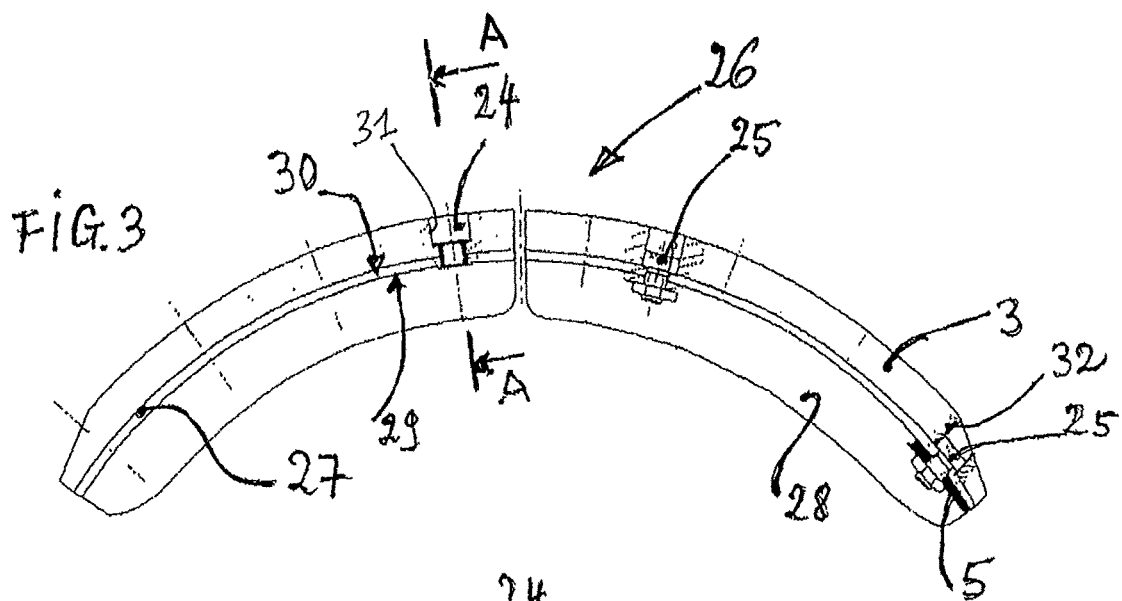
FIG. 3 shows a view in elevation and section of the lining-holder cartridge for a drum brake, according to the invention.

Reference is now made to FIGS. 3 and 3A, where the structure of the lining-holder cartridge 26 can be seen better, in its state removed with respect to the block. The view in transverse section of FIG. 3A shows the radial structure of the lining-holder cartridge 26, consisting of the stack of the metal support 27 and the lining 3 fixed to the metal support 27 by means of rivets 24. This figure also shows in transverse section (FIG. 3A) the reinforcement gussets 28 of the metal support 27, which are optional, but stiffen the latter further in order to prevent any unwanted bending of the support during braking.

FIG. 3 shows screw and nut assemblies 25 mounted in holes 32 passing through the lining 3 and the metal support 27. These screw and nut assemblies 25 fix, in a manner that is easily removable, the lining-holder cartridge 26 to the rim 5 (shown in broken lines in FIG. 2).

Naturally a person skilled in the art will be able to size the various components cited, according to the braking forces to be applied.

Figures 4A, 4B:
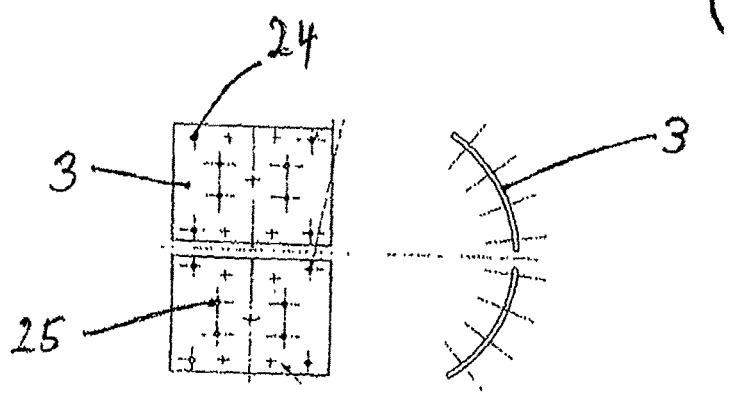
FIG. 4A shows a plan view of a lining for the lining-holder cartridge according to the invention.
FIG. 4B show a side view of the lining of FIG. 4A.
Figure 6:
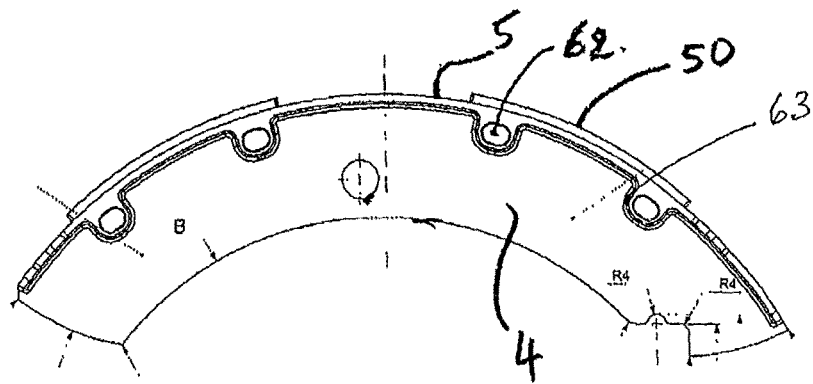
FIG. 6 shows a view in elevation of another variant of a drum brake block intended to receive a lining-holder cartridge according to the invention.
Figure 7:
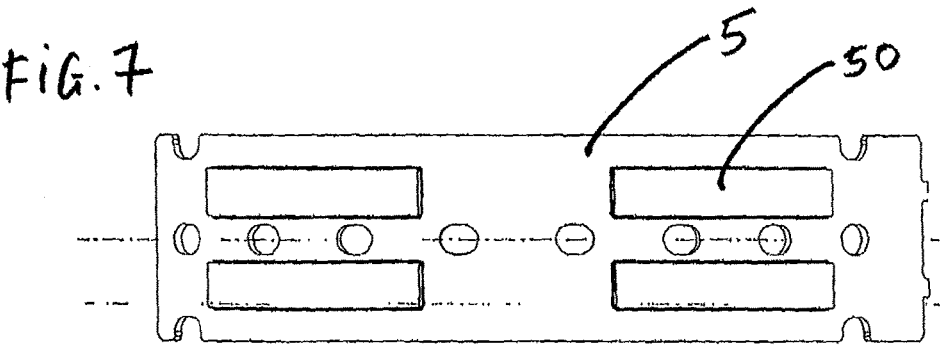
FIG. 7 shows a plan view of the drum brake block of FIG. 6.

As shown in FIGS. 4A and 4B, in a standard embodiment of the braking shoe 21 according to the invention, n rivets 24 per block will be provided, and m fixing screws 25 per lining and shoe, knowing that there are in general two shoes per drum brake, and one or more linings 3 per block and therefore per shoe. In a usual example embodiment, n=16 and m=8 will for example be taken, but a person skilled in the art will be in a position to make the best choice according to the standards and requirements specific to each case.

FIGS. 5 and 5A show a variant embodiment in which the single web 4 of the block can be replaced by a double web 44 welded to a rim 35.

In addition, as shown at 36 and 37, the ends of the web can have various shapes according to the customs of the various manufacturers.

Conventionally, the materials used for the blocks and for the supports 27 of the braking cartridges 26 are cast iron and steel, which afford a good diffusion of heat allied to sufficient elasticity during operation.

By virtue of this first embodiment of the invention, an operation of renovating a brake drum now comprises the following steps:
  removing the wheel;
  removing the brake drum, keeping the block in place;
  unscrewing the fixing screws 25 from the lining-holder cartridge 26 that carries the worn linings 3;
  replacing the worn lining-holder cartridge with a new lining-holder cartridge 26, and rescrewing the fixing screws 25;
  refitting the drum;
  refitting the wheel.

Consequently it will be noted in particular that it is possible to keep all the original adjustments of the brake (screws, springs), since the block is not removed.

SECOND EMBODIMENT

Reference is now made to FIGS. 6 to 10 in order to describe an even more advantageous variant of the invention in which the method of positioning and fixing the lining-holder cartridge 26 on the block has been modified.

For this purpose, the lining-holding cartridge 26 comprises apertures 59 (FIG. 10) provided on its support, and these apertures 59 cooperate with corresponding protrusions 50 provided on the back of the rim 5 of the block. This affords a precise lateral positioning of the cartridge 26 with respect to the rim 5, while keeping a little clearance in the longitudinal direction of the apertures, allowing slight angular floating of the cartridge 26 with respect to the rim 5 of the block.

In addition, this arrangement constitutes better resistance to the braking force, which is transferred onto the transverse section of the protrusions 50, instead of being transferred onto the smallest cross section of the fixing screws 25 in the previous embodiment.

In the preferred embodiment described in relation to FIGS. 6 to 10, it is nevertheless necessary to provide the fixing of the lining-holder cartridge 26 on the block, once the protrusions 50 are correctly engaged in the apertures 59.

To this end, the gussets 28 of the cartridge 26 are provided with orifices 52 that are in alignment with corresponding axial holes 62 provided at the protrusions 63 produced on the web 4 of the block. When the cartridge 26 is in place on the rim of the block, pins 53 are then engaged in the orifices 52 in the cartridge, and then in the axial holes 62 in the block, which has the effect of securing the cartridge 26 to the shoe block.

Figure 8:
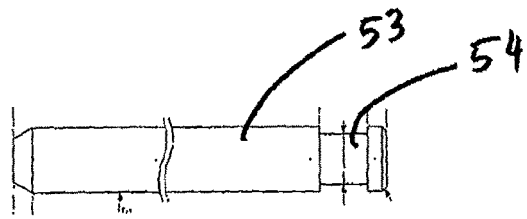
FIG. 8 shows a plan view of a pin for fixing the lining-holder cartridge to the block of FIG. 7.
Figure 9:
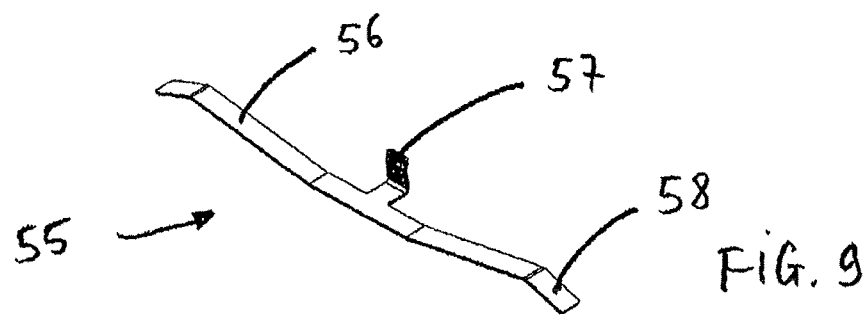
FIG. 9 shows a perspective view of a spring used for holding the pin of FIG. 8.
Figure 10:
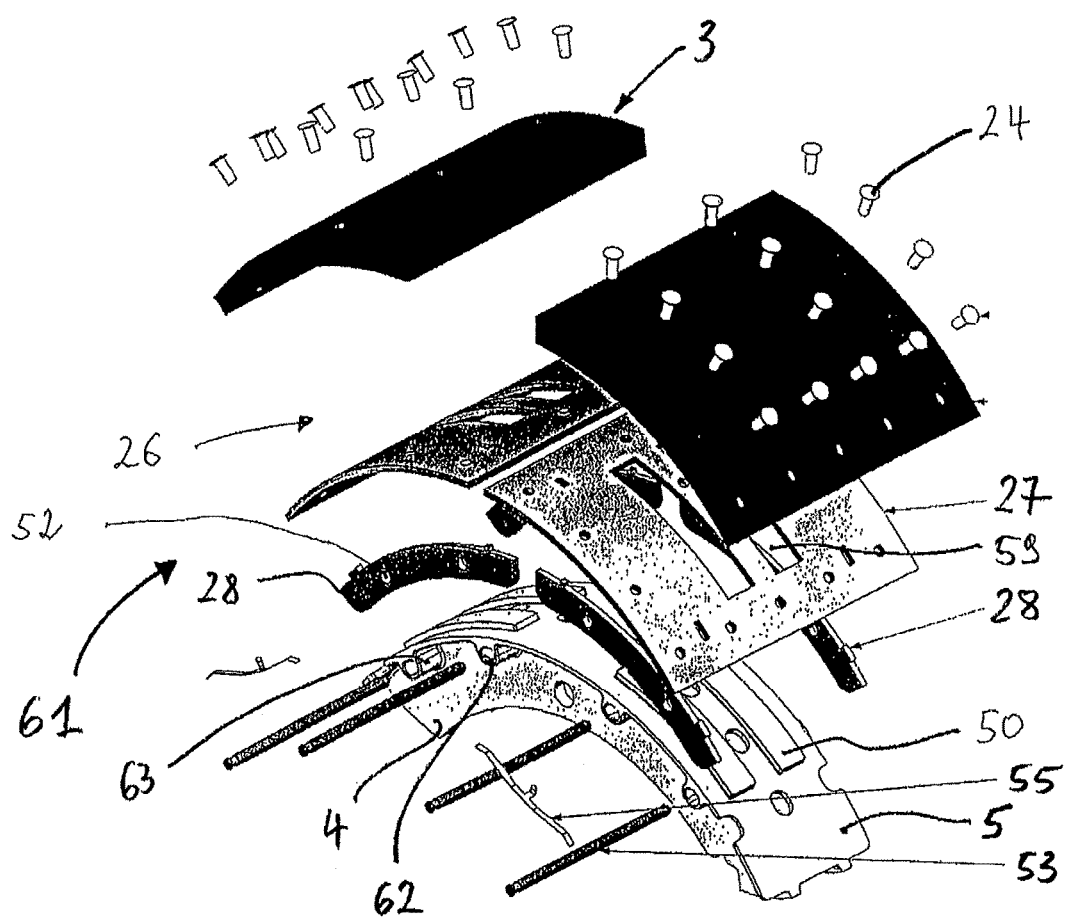
FIG. 10 shows a view in exploded perspective of a drum brake block corresponding to the variant in FIG. 6, provided with a lining-holder cartridge according to the invention.

In order to ensure that the pins 53 remain properly in place despite the forces and vibrations due to braking, springs 55 are positioned on two contiguous pins 53. The springs 55 are produced for example from a flat metal element the ends 58 of which engage in a groove 54 produced on each pin (FIG. 8). In addition, each spring 55 is held on the block by a lug 57 that engages in a respective slot (not shown) provided in the rim 5 of the block.

In addition to its better resistance to braking forces, this preferred arrangement allows an even more rapid fitting and removal of the lining-holder cartridges, since the step of unscrewing and rescrewing the fixing screws 25 has disappeared, in favour of a more rapid step of fitting the pins 53 and springs 55.

By virtue of this second embodiment of the invention, an operation of renovating a brake drum now comprises the following steps:
  removing the wheel;
  removing the drum from the brake, keeping the block in place;
  withdrawing the springs 55 and the pins 53;
  removing the lining-holder cartridge 26 that carries the worn linings 3, replacing the worn lining-holder cartridge with a new lining-holder cartridge 26, positioning the slots 59 in the cartridge on the protrusions 50 of the rim 5;

refitting the pins 53 and the springs 55;

replacing the drum;

replacing the wheel.

THIRD EMBODIMENT

It should be noted that a third embodiment of the invention can be envisaged. This is a mixed mode between the first and second embodiments, in which the method of fixing the cartridge 26 to the block by means of screws 25 would be kept as in the first embodiment, but the cartridge 26 would be positioned with respect to the block by means of the combination of protrusions 50 on the rim 5 and apertures 59 in the support 27 of the cartridge 26, as in the second embodiment.

Naturally, the operating method for a drum brake renovation would be adapted accordingly.

Advantages of the Invention

The invention responds to the stated problems. It results in a lower cost of the maintenance of the drum brake systems, in particular because it makes it possible to immobilise the vehicle for a minimum amount of time. This is because it allows an appreciably more rapid change of the worn linings.

Because of the reduced value of the elements that carry the linings (namely the intermediate braking cartridge), the stock of spare parts represents a lower immobilised value and hence better profitability for the repairers.

In addition, the modified brake according to the invention affords easy adaptation to the most representative brakes on the market, either by means of braking cartridges provided with the most widely sold standardised linings, or by means of complete lined shoes, comprising blocks specific to the various brake or vehicle manufacturers.

Finally, by virtue of the invention, it is possible optimise the design of the block while maintaining compliance with the so-called WVA standards for linings, except for the passage holes for fixing the lining-holder cartridge. These WVA standards define, for all manufacturers, the dimensional characteristics (thickness, width, diameter, number of holes etc) of the friction linings. In FIG. 4A, this corresponds in particular to n rivet holes. It should be noted that the invention in no way modifies the existing standard but simply adds to the existing friction linings the passage holes 32 for fixing the cartridge support 26, and this only in the first embodiment (FIGS. 2 to 5), whereas in the second embodiment (FIGS. 6 to 10) the friction linings 3 are not at all modified and are in all respects in conformity with the existing standards and practice.

The invention claimed is:

1. A lining-holder cartridge for a drum brake, comprising a block provided with a web and a rim for fixing a friction lining, the rim extending perpendicularly away from the web to form a T-shape with the web in cross section, the lining-holder cartridge forming a shoe for a drum brake, a curved support that forms a curve extending from one terminal end of the support to an opposite terminal end of the support, and which is configured to be fixed directly to the rim of said block, and a friction lining with a shape adapted to that of said support, wherein said support comprises two reinforcement gussets that extend from the one terminal end of the support to the opposite terminal end of the support, the reinforcement gussets provided on opposite sides of the web and formed by at least one metal sector welded under a bottom face of said support, wherein the support of the lining-holder cartridge is provided with at least one aperture, intended to cooperate with a corresponding protrusion provided on the rim of the block in order to provide the positioning of the lining-holder cartridge with respect to the rim of the block.

2. The lining-holder cartridge according to claim 1, wherein the lining comprises a plurality of through holes and is fixed to the support by a set of rivets positioned in said through holes.

3. The lining-holder cartridge according to claim 1, wherein said support comprises a plurality of holes for the passage of elements for fixing the lining-holder cartridge to the rim of the block.

4. The lining-holder cartridge according to claim 3, wherein the fixing of the lining-holder cartridge to the rim of the block is obtained by means of self-locking screws that pass through the fixing holes in the cartridge and the ends of which are fixed in bores provided in the rim of the block.

5. The lining-holder cartridge according to claim 1, wherein the reinforcement gussets of the cartridge are provided with orifices and the block is provided with corresponding axial holes aligned with said orifices in the reinforcement gussets, so that attached pins inserted in the axial holes in the cartridge and the orifices in the reinforcement gussets fix the lining-holder cartridge to the rim of the block.

6. The lining-holder cartridge according to claim 5, wherein the pins comprise at their ends grooves in which the ends of springs connected to the rim and holding the pins in place engage.

7. The lining-holder cartridge according to claim 1, in combination, a plurality of holes for the passage of elements for fixing the lining-holder cartridge to the rim of the block and self-locking screws that pass through the fixing holes in the cartridge and the ends of which are fixed in bores provided in the rim of the block.

8. A drum brake for a wheel of a vehicle, comprising at least two brake shoes, each comprising the lining-holder cartridge according to claim 1, wherein the block of each of the at least two brake shoes is actuatable by a lever.

9. The drum brake according to claim 8, wherein each lining-holder cartridge is fixed to the rim of the block of the shoe by screw and nut assemblies or self-locking screws.

10. The drum brake according to claim 8, wherein said lining-holder cartridge is fixed to the rim of the block by a set of pins engaged in orifices provided on the cartridge and corresponding holes provided on the block, said pins being held by springs.

11. A lining-holder cartridge for a drum brake, comprising a block provided with a web and a rim for fixing a friction lining, the lining-holder cartridge forming a shoe for a drum brake, a curved support in the form of a cylinder sector configured to be fixed directly to the rim of said block, and a friction lining with a shape adapted to that of said support, wherein said support comprises at least one reinforcement gusset, formed by at least one metal sector welded under a bottom face of said support, wherein the at least one reinforcement gusset of the cartridge is provided with orifices and the block is provided with corresponding axial holes aligned with said orifices in the at least one reinforcement gusset, so that attached pins inserted in the axial holes in the block and the orifices in the at least one reinforcement gusset fix the lining-holder cartridge to the rim of the block, and wherein the pins comprise at their ends grooves in which the ends of springs connected to the rim and holding the pins in place engage.

12. The lining-holder cartridge according to claim 1, wherein the fixing of the lining-holder cartridge to the rim of the block is obtained by means of self-locking screws that pass through the fixing holes in the cartridge and the ends of which are fixed in bores provided in the rim of the block.

13. The lining-holder cartridge according to claim 11, wherein the lining comprises a plurality of through holes and is fixed to the support by a set of rivets positioned in said through holes.

* * * * *